(12) United States Patent
Wohlrab

(10) Patent No.: US 8,414,287 B2
(45) Date of Patent: Apr. 9, 2013

(54) CLAMPING UNIT FOR AN INJECTION MOLDING MACHINE

(75) Inventor: Walter Wohlrab, Weissenburg (DE)

(73) Assignee: KraussMaffei Technologies GmbH, München (DE)

( * ) Notice: Subject to any disclaimer, the term of this patent is extended or adjusted under 35 U.S.C. 154(b) by 0 days.

(21) Appl. No.: 13/383,947

(22) PCT Filed: Jul. 8, 2010

(86) PCT No.: PCT/EP2010/059792
§ 371 (c)(1),
(2), (4) Date: Jan. 13, 2012

(87) PCT Pub. No.: WO2011/009734
PCT Pub. Date: Jan. 27, 2011

(65) Prior Publication Data
US 2012/0107448 A1 May 3, 2012

(30) Foreign Application Priority Data

Jul. 22, 2009 (DE) .......................... 10 2009 034 176

(51) Int. Cl.
*B29C 45/68* (2006.01)
(52) U.S. Cl. ........................................ 425/592; 425/593
(58) Field of Classification Search ................. 425/592, 425/593, 451.5, 451.6
See application file for complete search history.

(56) References Cited

U.S. PATENT DOCUMENTS

| 4,273,524 | A | * | 6/1981 | Smith | 425/593 |
| 4,588,364 | A | * | 5/1986 | Schad | 425/593 |
| 5,350,291 | A | * | 9/1994 | Kitajima | 425/593 |
| 6,312,249 | B1 | * | 11/2001 | Schreiner et al. | 425/592 |
| 7,445,439 | B2 | * | 11/2008 | Wohlrab | 425/592 |
| 2007/0172687 | A1 | | 7/2007 | Martin-Portugues et al. | |

FOREIGN PATENT DOCUMENTS

| DE | 102004029269 | 1/2005 |
| JP | 04364917 A | 12/1992 |
| WO | WO 2005/118718 | 12/2005 |

* cited by examiner

*Primary Examiner* — James Mackey
(74) *Attorney, Agent, or Firm* — Henry M. Feiereisen LLC

(57) ABSTRACT

The present invention relates to a clamping unit for an injection molding machine, comprising a displaceable clamping plate (2), a support plate (3) and a drive device acting between the displaceable clamping plate (2) and the support plate (3), which has at least one electric motor (21, 121) and at least one connecting rod (10-13; 110-113), wherein the electric motor (21, 121) directly or indirectly acts on the connecting rod or connecting rods (10-13; 110-113) for opening, closing and/or applying the clamping force. According to the invention, it is proposed to provide in addition to the electric motor (21, 121) at least one separate hydraulic drive (116, 116', 116"), which is joined by a hinge separately to a connecting rod and acts in parallel to and independently of the electric motor at least at times for opening, closing and/or applying the clamping force.

16 Claims, 3 Drawing Sheets

CLAMPING UNIT FOR AN INJECTION MOLDING MACHINE

CROSS-REFERENCES TO RELATED APPLICATIONS

This application is the U.S. National Stage of International Application No. PCT/EP2010/059792, filed Jul. 8, 2010, which designated the United States and has been published as International Publication No. WO 2011/009734 and which claims the priority of German Patent Application, Serial No. 10 2009 034 176.5, filed Jul. 22, 2009, pursuant to 35 U.S.C. 119(a)-(d).

BACKGROUND OF THE INVENTION

The present invention relates to a clamping unit for an injection molding machine.

In injection molding machines, clamping units serve to receive molding tools, mostly constructed in two parts in which in the closed state a plastic melt, which is produced in a plasticizing unit, is injected for the production of a product. Here, the two molding tools must be held together with a great pressure during the injection process. After the cooling and hardening of the plastic product, the clamping unit and therewith the molding tool is opened, in order to be able to remove the product which has thus been produced (DE 10 2004 029 269 A1, WO 2005/118718 A1).

The clamping units are generally classified into so-called two-plate clamping units with one displaceable and one fixed clamping plate, on which the molding tools are clamped, and three-plate clamping units with one fixed and one displaceable clamping plate and one support plate.

In the latter type, generally a drive device acts between the support plate and the displaceable clamping plate, which device is often constructed for opening and closing the clamping unit, but in any case for applying the clamping pressure. The two operating phases of opening and closing on the one hand and of applying the clamping pressure on the other hand differ considerably here in their requirement profile. On opening and closing, the displaceable clamping plate should be moved as quickly as possible, wherein only the mass moments of inertia and frictions must be overcome. This travel movement often also takes place over a longer distance. On applying the clamping force, generally a distance scarcely has to be overcome. The concern here is with applying enormous clamping forces, in order to be able to press the molding tools onto each other with the required force.

In fact in clamping units for large parts, for which a considerable clamping force is necessary, it was usual hitherto to use purely hydraulic drives.

In clamping units for smaller clamping forces (smaller machines), in fact in recent times, however, instead of hydraulic drives electric drives have become established, which have some advantages. Firstly, significant energy savings are possible. These savings are in fact of particular importance in the present time of high energy costs for operating the machine. However, the acquisition costs for electromotive drives increase disproportionately with their size. This has led to the electric motors not being able to become established hitherto in particular in larger machines, because excessively high costs would have to be accepted.

SUMMARY OF THE INVENTION

It is an object of the present invention to indicate a clamping unit which is suitable in particular for great clamping forces, is able to be operated in an energy-efficient manner, is able to be actuated quickly and is convenient in construction.

This object is solved by by a clamping unit for an injection molding machine which includes a displaceable clamping plate, a support plate, and a drive device acting between the displaceable clamping plate and the support plate, which has at least one electric motor and at least one connecting rod, wherein the electric motor acts directly or indirectly on the connecting rod or connecting rods for opening, closing and/or applying the clamping force, wherein in addition to the electric motor at least one separate hydraulic drive is provided, which is separately joined by a hinge to a connecting rod and acts in parallel to and independently of the electric motor at least at times for opening, closing and/or applying the clamping force.

A central idea of the present invention is to be seen in that at least a substantial portion of the opening and closing actuation in the clamping unit is brought about by means of the electric motor. Here, the electric motor serves in particular to open and to close the clamping unit, which it can bring about quickly and in an energy-efficient manner. In this operating phase, a good energy efficiency can preferably be achieved if the braking energies on braking of the displaceable clamping plate are fed back into the network again via the electric motor.

The electric motor also serves to apply at least a portion, possibly a majority, of the clamping force. In addition to the electric motor, however, a separate hydraulic drive is provided in parallel, which is separately joined by a hinge to a connecting rod of the drive of the clamping unit and acts in parallel to and independently of the electric motor possibly for opening and closing at times, but in particular for the shared application of the clamping force.

According to a particular embodiment of the present invention, the hydraulic drive serves exclusively for assistance in the build-up of the clamping force. Therefore, the electric motor can be designed so that it operates in a high efficiency range and applies for example 30-80% of the clamping force. The remainder is provided by the hydraulic drive.

Therefore, the essential advantages of the electric motor, namely the quick actuation of the clamping unit and the energy efficiency, can be utilized. Moreover, however, it is possible to also realize high clamping forces in a simple manner. According to the present invention, it is not necessary to use switchover- or locking mechanisms on switching on the hydraulic drive.

Moreover, the device according to the invention is simply constructed, because for example simple and commercially available piston-cylinder systems can be used for the hydraulic drive, which are convenient to obtain. These piston-cylinder systems can be constructed so as to be preferably doubly effective, so that they can be used e.g. on the one hand for applying the clamping force, but on the other hand can also be used in a supporting manner for the pulling open of the clamping unit at the start of the opening process.

Preferably, the hydraulic cylinder is connected with a hydraulic supply via a simple valve. This valve can be a simple switchover valve which can optionally act on the double-acting piston in both directions or can set it "to neutral". In such a neutral position, the piston would be able to be pushed freely to and fro, wherein only the smallest quantities of hydraulic fluid (e.g. in the range of 0.5 to 3 liters) would have to be displaced.

To supply the hydraulic cylinder with pressure fluid, it can be connected with a corresponding hydraulic source via the above-mentioned switchover valve. Preferably here in particular a hydraulic drive system which is already present in the injection molding machine is suitable here, having an accumulator in which a hydraulic fluid is held available at a particular pressure. Such accumulator systems are used in particular in so-called high speed injection molding machines, in which a high injection speed must be reached. These injection speeds must be reached in particular when the mold is closed. On closing of the mold itself an operation of the injection device is mostly not necessary, so that the hydraulic source can be used for the hydraulic drive or the hydraulic drives of the clamping unit.

In this situation, only very few additional units to the already existing components are required, namely a commercially available hydraulic cylinder and a simple switchover valve, which is connected to the already present accumulator, in order to realize the corresponding application of force. A throttle possibly serves to attenuate the load peaks during the switchover process.

The present invention can be realized together with a plurality of conventional electric drives. Firstly, it is possible to realize the present invention in combination with a bent lever drive (e.g. 4-point bent lever or 5-point bent lever) which is known per se and has been used successively for several years. For this, the hydraulic piston must engage on a connecting rod of the bent lever, which is connected with the displaceable clamping plate or with the support plate. For example, the hydraulic piston can engage between a connecting rod which extends from the support plate in the direction of the crosshead, wherein the hydraulic cylinder can be interconnected between this connecting rod and the support plate.

On the other hand, the interconnection of the additional hydraulic drive can also be carried out between a connecting rod which extends from the crosshead towards the displaceable clamping plate. Here, the hydraulic cylinder is interconnected between this connecting rod and the displaceable plate and is joined by a hinge to these elements.

A further possibility for realization is known in connection with a crank drive (also Z drive) which is known per se. Here, a crank is rotatably driven, which actuates a connecting rod which is joined by a hinge accordingly with the support plate or with the displaceable clamping plate. Depending on the rotational actuation and degree of rotation, the opening, closing or applying of the clamping force is achieved for the displaceable clamping plate. Here, the clamping force is generally realized in the lateral dead centre position.

Such crank drives preferably have connecting rods situated on the one hand between the support plate and the crank unit and on the other hand between the crank unit and the displaceable clamping plate. Again here the additional hydraulic drive can act on both connecting rods. In the first variant, the additional hydraulic drive acts between the support plate and the connecting rod of the first type, and in the second variant the additional hydraulic drive acts between the connecting rod of the second type and the displaceable clamping plate.

Such systems can also be varied in many ways. For example, two crank units can be provided with the corresponding number of connecting rods, wherein different connecting rods are acted on in a symmetrical manner by the hydraulic drive.

However, it is also possible to interconnect the hydraulic drive between two connecting rods such that with an application of pressure of the hydraulic drive, an intensification of the clamping force takes place in that the two connecting rods are pressed apart relative to each other.

Further embodiments and features will be apparent from the claims.

The present invention has the advantage that the hydraulic drive can be used in addition to the electric drive and namely without further mechanical elements such as locks, coupling-in mechanisms, etc. Therefore only a superimposing of the two forces from the different drives takes place, which complement each other with regard to the clamping force or also to the pulling-open force.

BRIEF DESCRIPTION OF THE DRAWINGS

The present invention is to be explained in further detail below with reference to the enclosed drawings with regard to various embodiments. The drawings show in FIG. 1a a diagrammatic representation of a clamping unit according to the invention with a crank shaft drive in closed position, FIG. 1b a diagrammatic partial representation of a clamping unit according to the invention with a crank shaft drive in open position, FIG. 2 a diagrammatic representation of a further embodiment of a clamping unit according to the invention with bent lever and a first arrangement of the hydraulic cylinders, FIG. 3 a diagrammatic representation of a further embodiment of a clamping unit according to the invention with bent lever and a second arrangement of the hydraulic cylinders, FIG. 4 a diagrammatic representation of a further embodiment of a clamping unit according to the invention with bent lever and a third arrangement of the hydraulic cylinders, and FIG. 5 a diagrammatic representation of a final embodiment of a clamping unit according to the invention with bent lever, in which the hydraulic drive unit is interconnected between two connecting rods.

DETAILED DESCRIPTION OF PREFERRED EMBODIMENTS

Figure 1:
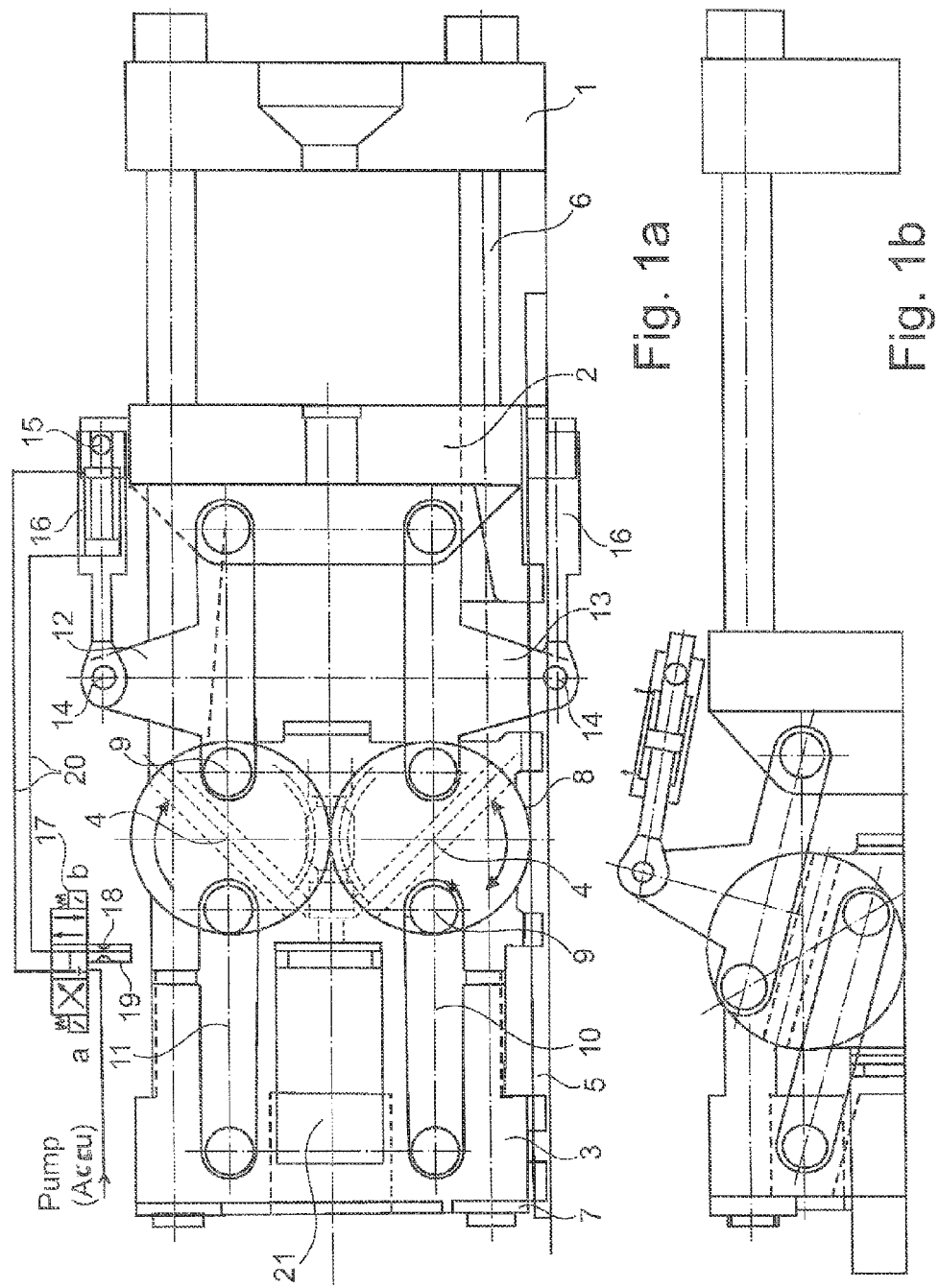

In FIGS. 1a and 1b a clamping unit according to the invention is illustrated with a Z crank drive, known per se, here a double crank drive. FIG. 1a shows here the clamping unit in closed position and FIG. 1b shows the upper half of the clamping unit in open position.

This clamping unit is generally integrated into an injection molding device and is mounted on a machine bed. In particular, a fixed mold clamping plate 1 is provided, which in the present case is connected securely with the machine bed and on which a tool half can be arranged. On the machine bed (not illustrated) a displaceable clamping plate 2 is held so as to be displaceable to and fro via guide elements 5, wherein in FIGS. 1a and 1b no molding tool is shown. At the left-hand end in FIG. 1a, a support plate 3 is situated, which is mounted in a floating manner on the machine bed, and which serves for supporting a drive device which is described below, in order to displace the displaceable clamping plate to and fro under corresponding application of force and to apply the clamping force.

In the embodiment in FIGS. 1a and 1b, the drive device consists of two crank drives arranged and acting in parallel to each other, with respectively a crank unit 4 (crank disc), connecting rods of the first type 10 and 11, which are respectively joined by a hinge to the support plate 3 and to the crank disc, and connecting rods of the second type 12 and 13, which are joined by a hinge respectively between the crank discs 4 and the displaceable clamping plate 2 in the form shown in FIG. 1a. Depending on the construction, the cranks can also be configured so as to be double.

The crank units 4 have respectively toothed wheels on which a worm drive shaft 8 of the electric motor 21 meshes. Here, the toothings and of the toothed wheels are configured so that on operation of the drive motor 21 via the worm drive shaft 8 the two crank units 4 are acted on in the opposite rotation direction and according to the rotation direction the displaceable clamping plate is displaced in a corresponding manner. Here in FIG. 1*a*, the closed position is reached in the lateral, outer dead centre position. In FIG. 1*b*, the maximum opening position is shown. A possible necessary vertical adjustment of the tool can take place here via four nuts 7 which cooperate with posts 6 which connect the support plate and the fixed clamping plate with each other and on which possibly the displaceable clamping plate is guided.

On the two connecting rods of the second type 12 and 13, articulation points 14 are realized, respectively laterally offset via links, between which and corresponding articulation points on the displaceable clamping plates 15 respectively a hydraulic drive 16 with a hydraulic cylinder and a hydraulic piston are provided. The hydraulic cylinder and the hydraulic piston of the hydraulic drive are constructed here so as to be double-acting, so that the hydraulic drive can be acted on with respect to pressure and also with respect to tension.

Each double-acting hydraulic drive 16 is connected via hydraulic lines with a valve which is constructed here as a simple 3-way switchover valve, by which the hydraulic drives 16 can be switched into the one actuating direction, into the other actuating direction and in neutral.

An input of the hydraulic valve 17 is connected here with an accumulator of a drive system for the injection unit (not illustrated).

On the other hand, the output of the 3-way switchover valve is connected via a throttle with a return flow container or tank. Depending on the switching of the valve, the hydraulic drives can therefore either be connected in neutral or acted on in one of the two operating directions.

Through the articulation of the hydraulic drive respectively on the offset articulation point 14, the links can now be moved about the rotation point of the connecting rods 12 and 13 with the displaceable clamping plate 12, so that through a corresponding action on the hydraulic drives 16 the rotary drive of the crank discs 4, brought about by the electric motor, can be supported. It has been found here in a calculation that the electric motor 21 with corresponding design can carry out the travel movement up to approximately 6° before the dead centre position. Then the build-up of clamping force begins. An additional action with the above-mentioned described hydraulic drives is only necessary for the region of the build-up of clamping force, i.e. the last 6° up to the dead centre position. The drive maximum here lies for example at 2-3° before the dead centre position, according to the geometry.

The hydraulic drives can be used here both for applying the clamping force and also for pulling open the molding tool on opening of the molding tool. In the remaining actuation phases, the hydraulic pistons can be switched into neutral, so that they "travel along" without any application of force. In so doing, quantities of hydraulic fluids scarcely have to be moved.

The advantage of the construction shown in FIGS. 1*a* and 1*b* lies here in that on operation of the hydraulic drive, the electric motor 21 is not additionally loaded, but rather is relieved of load, so that the respective forces fully complement each other.

This has the advantage that smaller electric motors can be used for the actuation of the clamping unit, but also the design of the gears can be selected to be weaker. With a corresponding design of the hydraulic drives, reductions can thus be achieved in the electric drive in the region of approximately 50%. This lead to clamping units with a high clamping force also being able to be realized with smaller electric drives. If for economic reasons the clamping force in purely electrically driven clamping units was restricted today to 600-800 to clamping force, then with the present embodiment clamping forces up to 1,500 to and beyond can be reached without great effort.

The fact that the present invention can also be coupled with a plurality of other hitherto purely electric drives can be seen from the further FIGS. 2-5, which describe the fundamental idea of the present invention solely in purely diagrammatic representation and omitting details which are not necessary for an understanding of the invention.

Figure 2:
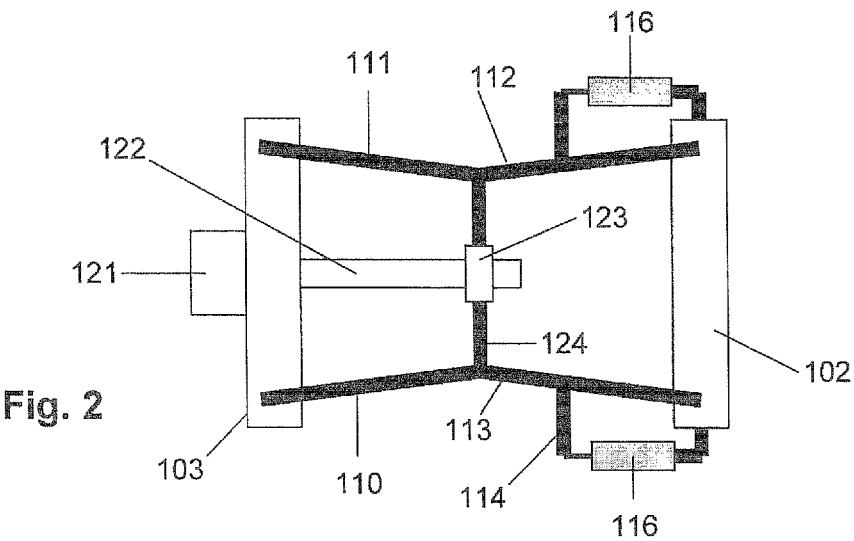

Thus in FIG. 2 a bent lever clamping unit is illustrated with a displaceable clamping plate 102, a support plate 103 and a (here) 4-point bent lever arranged therebetween. This 4-point bent lever comprises links of the first type 110 and 111 between the support plate 103 on the one hand and a crosshead 123 on the other hand, and also connecting rods of the second type 112, 113 between the crosshead on the one hand and the displaceable clamping plate on the other hand. Between the crosshead 123 and the two links of the first type 110, 111 and of the second type 112, 113, in addition connecting links 124 are provided. In a manner known in many cases, the crosshead 123 is moved to and fro through the drive of a spindle-nut combination, whereby with corresponding displacement of the connecting rods, the displaceable clamping plate also moves. Here on the support plate 103 an electric motor 121 is arranged, which drives a drive spindle 122 rotatably. In the interaction with a nut arranged fixedly in the crosshead 123, this brings about the actuation of the bent lever. This technique is sufficiently known.

In addition to the drive of the bent lever via the electric motor, individual connecting rods can now be acted on in parallel with force. In the embodiment according to FIG. 2, this is achieved in that between the two connecting rods of the second type 112 and 113 and the displaceable clamping plate in an analogous manner as also in the embodiment in FIGS. 1*a* and 1*b* respectively hydraulic drives are provided with cylinder and piston, which can apply in the desired manner a corresponding additional force to these connecting rods 112 and 113. Here, also, the force is added via the electric drive 121 to the bent lever 123 with the force via the hydraulic drives 116, because they act on the respective connecting rods in an identical manner and here also no mechanical locking or other action is required, in order to switch over from an opening or closing movement to an application of the clamping force. Rather, the additional force can simply be added via the additional hydraulic drives.

Figure 3:
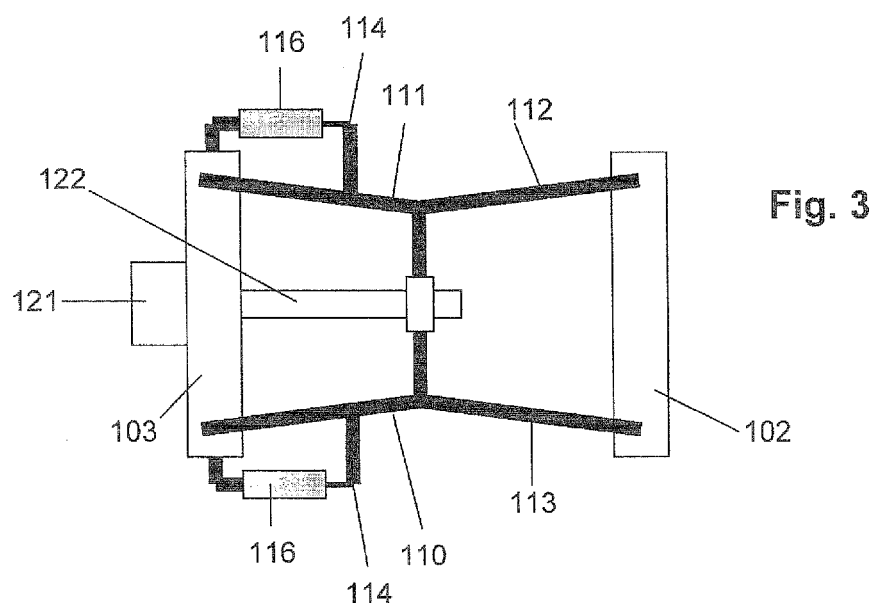

The embodiment in FIG. 3 differs from that in FIG. 2 only in that the hydraulic drives 116 are now arranged between the connecting rods of the first type 110 and 111 and the support plate 103. Otherwise, the mode of action and operation is analogous to the embodiment in FIG. 2.

Figure 4:
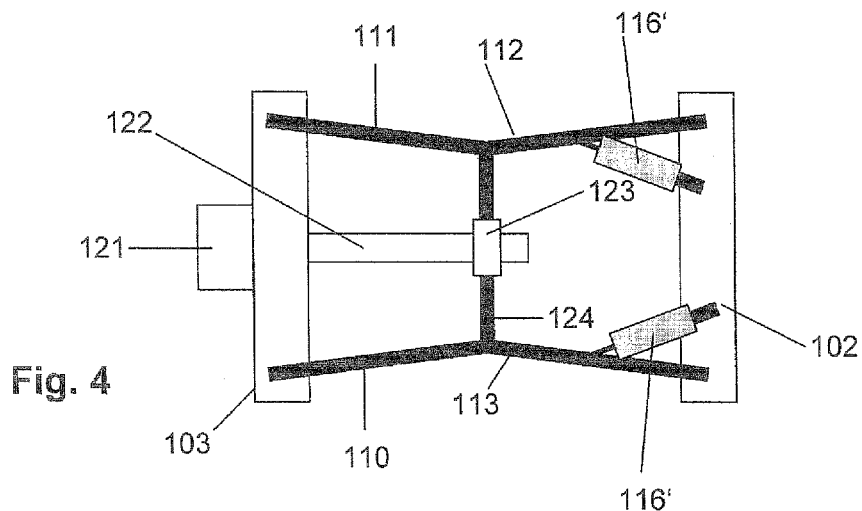

In the embodiment in FIG. 4, compared with that in FIG. 2, a different arrangement of the hydraulic cylinders 116' is selected respectively between the connecting rods 112 and 113.

Figure 5:
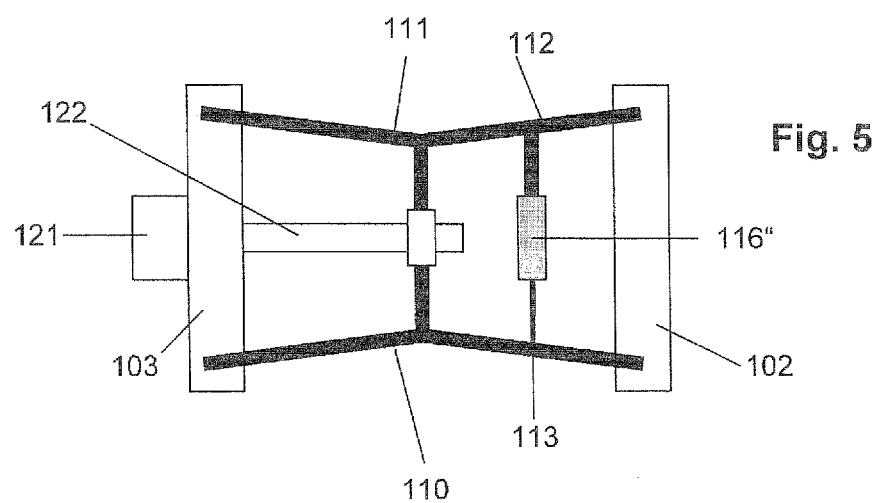

The embodiment in FIG. 5 shows that the hydraulic drive or drives do not compulsorily have to be joined by a hinge to the support plate 103 or to the displaceable clamping plate 102. It is also possible to insert the hydraulic drive directly between two connecting rods (here between the two connecting rods of the second type 112 and 113) and to press the two connecting rods 112 and 113 apart through a corresponding operation of the hydraulic drive 116", whereby this force again supplements the force applied by the motor 121.

As a whole, with the present invention a clamping unit can be realized which on the one hand utilizes the advantages of the electric drives and on the other hand permits a realization of clamping units for high clamping pressures, without the costs rising excessively. Thereby, the gears, the drive motors and the converters of the electric drive units hitherto can be reduced accordingly in their design and the high locking moments do not load the gear unit itself. The consequences therefore, in addition to low costs, are also a greater lifespan and a smaller wear of the components of the electrically operated part of the drive.

What is claimed is:

1. A clamping unit for an injection molding machine, said clamping unit comprising:
    a displaceable clamping plate;
    a support plate;
    a drive device acting between the displaceable clamping plate and the support plate, said drive device having at least one electric motor and one or more connecting rods, said electric motor acting directly or indirectly on the connecting rods for opening, closing and/or applying a clamping force; and
    at least one hydraulic drive separately hinged to a selected one of the connecting rods and acting in parallel to and independently of the electric motor at least at times for opening, closing and/or applying the clamping force.

2. The clamping unit of claim 1, wherein the hydraulic drive is hinged to the selected one of the connecting rods and to at least one member selected from the group consisting of the support plate, the displaceable clamping plate, and another one of the connecting rods, and acts at least at times for opening, closing and/or applying the clamping force.

3. The clamping unit of claim 1, wherein the hydraulic drive has a hydraulic cylinder and a hydraulic piston reciprocating in the hydraulic cylinder.

4. The clamping unit of claim 3, wherein the hydraulic piston and the hydraulic cylinder are constructed so as to be double-acting.

5. The clamping unit of claim 3, further comprising a hydraulic supply and switchable valve for controlling a flow of hydraulic fluid to the hydraulic cylinder.

6. The clamping unit of claim 5, wherein the valve is a switchover valve.

7. The clamping unit of claim 5, further comprising a throttle provided between the valve and a return flow container.

8. The clamping unit of claim 5, wherein the hydraulic supply device has an accumulator.

9. The clamping unit of claim 1, wherein the drive device includes a bent lever drive with a spindle-nut combination, said electric motor driving the spindle or the nut of the spindle-nut combination.

10. The clamping unit of claim 9, wherein the bent lever comprises a crosshead, at least a first one of the connecting rods being provided between the support plate and the crosshead, and at least a second one of the connecting rods being provided between the crosshead and the displaceable clamping plate.

11. The clamping unit of claim 10, wherein the hydraulic drive is provided between the support plate and the first one of the connecting rods.

12. The clamping unit of claim 10, wherein the hydraulic drive is provided between the second one of the connecting rods and the displaceable clamping plate.

13. The clamping unit of claim 1, wherein the drive device comprises a rotatably driven crank unit, at least one of the connecting rods being arranged between the crank unit and a member selected from the group consisting of the support plate and the displaceable clamping plate.

14. The clamping unit of claim 13, wherein a first one of the connecting rods is arranged between the support plate and the rotatably driven crank unit, and a second one of the connecting rods is arranged between the rotatably driven crank unit and the displaceable clamping plate.

15. The clamping unit of claim 1, further comprising two crank units, said electric motor driving the two crank units.

16. The clamping unit of claim 1, further comprising two crank units and a further said electric motor for respectively driving the two crank units separately from one another.

* * * * *